Aug. 15, 1933.　　H. G. H. LINNENBRUEGGE　　1,922,689
METHOD OF FORMING SCREW THREADED MEMBERS

Filed July 11, 1931

H.G.H.LINNENBRUEGGE
INVENTOR

BY
ATTORNEY

Patented Aug. 15, 1933

1,922,689

UNITED STATES PATENT OFFICE 1,922,689

METHOD OF FORMING SCREW-THREADED MEMBERS

Hans G. H. Linnenbruegge, Buffalo, N. Y.

Application July 11, 1931. Serial No. 550,086

3 Claims. (Cl. 10—1)

This invention relates to screw and nut structures, and more particularly to screw and nut connections in which there is a difference in the pitch of the threads of the screw and nut, to take care of the elasticity of the material of which they are made, in such a way that the strength of the connection is increased under abnormal or increased load, and liability of breakage of the connection is very materially decreased.

More particularly, the present invention relates to screw and nut connections designed for use on piston rods, connecting rod bolts, tie rods, studs, inside of the piston of an internal engine, and for analogous uses, where temperature and load variances cause variation of the stress and load on the threads of the screw and nut connections, and which screw and nut connections will, through the distribution of the stresses thereon, due to their novel construction, materially reduce breakage.

The invention comprehends specifically the provision of a screw and nut connection in which the pitch of the threads of the screw is a trifle shorter than the pitch of the threads of the nut, so that when threaded or screwed together, the threads at the outermost part of the nut and screw will receive the major portion of the load or stresses, in contradistinction to the distribution of such stresses to the innermost threads in the ordinary construction of nuts and bolts. In the present invention, the stresses gradually diminish towards the innermost threads of the nut, under normal loads; when, however, the stresses are increased due to increased load on the bolt or screw, the resultant increase of load will, due to the elasticity of the metal, have a tendency to stretch the bolt or screw, and bring all of the threads thereof, or a proportionate, increased number of them, in proportion to the increased stresses, into full stress-bearing engagement with the corresponding threads of the nut, and thus distribute the stresses throughout the entire length of the threaded connection between the bolt and nut, and consequently eliminate the application of the augmented stress due to the increased load, to a relatively concentrated portion of the thread and nut, thereby very materially eliminating liability of breakage, which often results in nut and bolt connections used in conditions where the load or temperature thereof varies to a relatively great extent, at various times during the operation of the mechanism with which the nut and bolt is associated.

With these and other objects in view, as may appear from the accompanying specification, the invention consists of various features of construction and combination of parts, which will be first described in connection with the accompanying drawing, showing a screw and nut structure of the preferred form embodying the invention, and the features forming the invention will be specifically pointed out in the claims.

Figure 1:
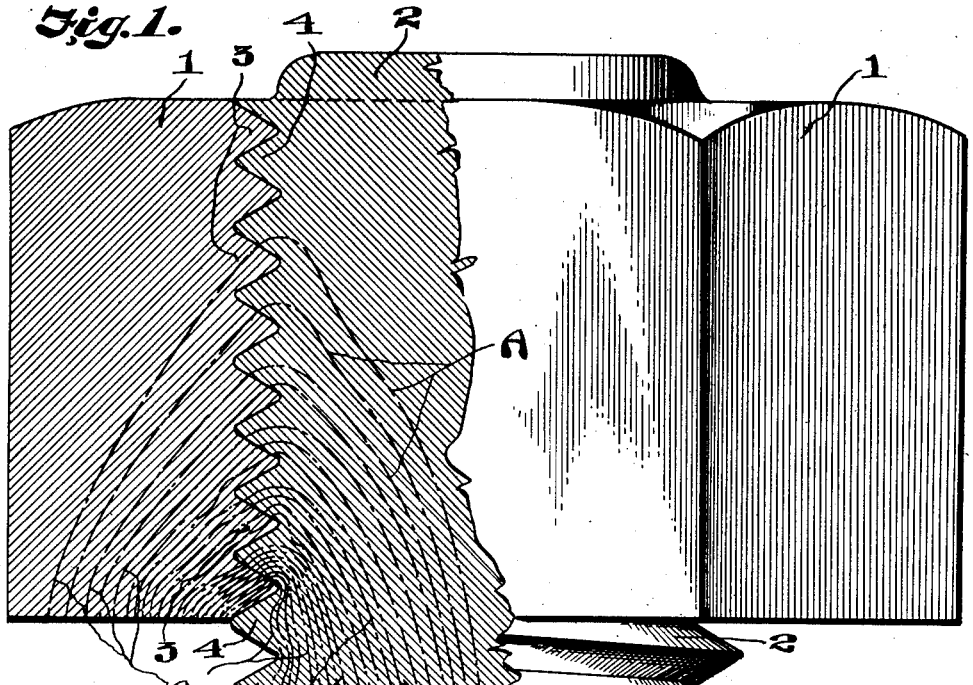
Fig. 1 is a view, partly in section, of an ordinary approved type of screw and nut, illustrating the application of stresses thereon.

Referring more particularly to the drawing, Fig. 1 shows a nut 1 and a screw 2, each having standard screw threads 3 and 4, respectively, formed thereon. The threads 3 and 4 are of uniform pitch and consequently fit snugly on all surfaces when the bolt is threaded into the nut. In standard threaded nuts and bolts or screw members, the danger point is the section of the screw member and nut at the inner end of the nut, and it is at this point where breakage most often occurs, upon the application of increased stresses or loads to the bolt or screw member. The distribution of the stresses of the load of an approved type of nut and screw member connection is illustrated by the lines A in Fig. 1 of the drawing, each line representing the same amount of load, and it will be noted that the threads nearest the inner end of the nut carry the heaviest loads and the greatest proportion of such stresses. Any increase in load will augment the number of lines A or the stress in the first and second threads from the inner end of the nut more than any others, because upon the application of such increased load, the nut 1 and the pitch of its threads is shortened under the stress, whereas the bolt or screw member 2 and the pitch of its threads is lengthened to such an extent that the outermost threads transmit very little, if any, force at all. This concentrates the stress on a relatively small area of the thread connection, and causes breakage, either of the threads or of the bolt itself.

Figure 2:
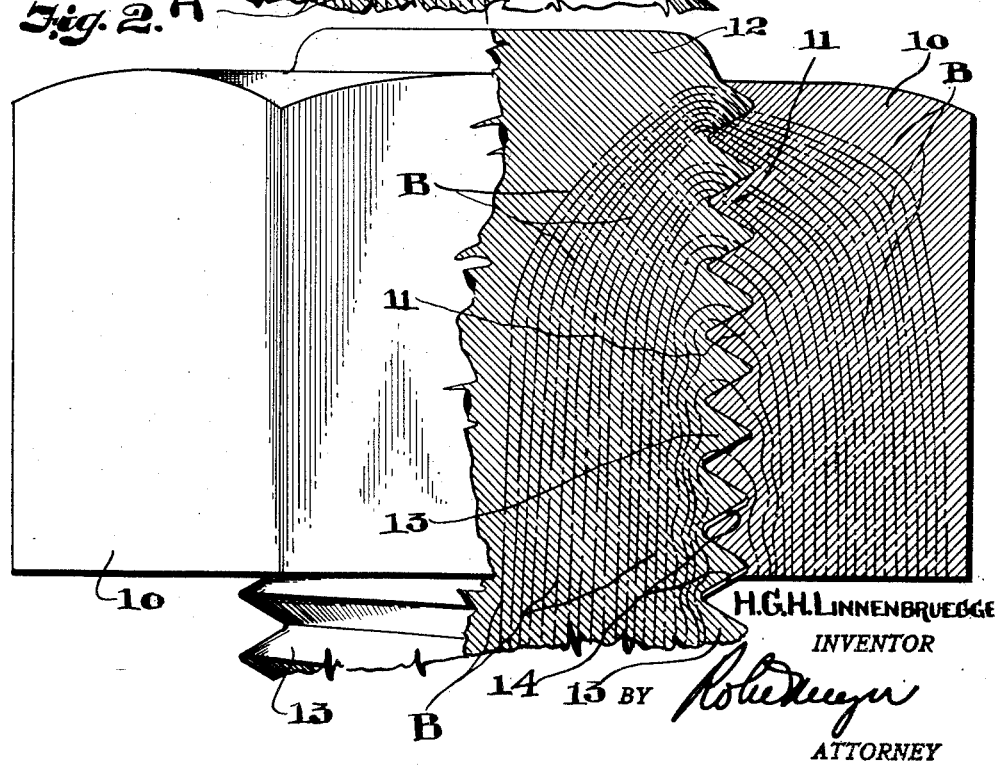
Fig. 2 is a view, partly in section, of a screw and nut constructed in accordance with the present invention, and illustrating the distribution of the stresses thereon.

The present invention as shown in Figure 2 of the drawing comprises a nut 10, which has standard threads 11 thereon, and the bolt or screw member 12, provided with standard threads 13. These standard threads 13 are of uniform shape and constant pitch throughout the threaded length of the screw member, or bolt 12, but the pitch of these threads 13 is slightly shorter than the pitch of the threads 11, so that when the screw member 12 is threaded into the bolt 10, the threads 13 will have their inner surfaces spaced from the upper faces of the threads 11, as clearly shown at 14 of the drawing. With this construction, the stresses through the bolt will be distributed, because the threads 13 at the outer end of the screw member, or bolt 12, will be first to contact completely with the threads 11, the application of load causing a stretching of the screw member or bolt. Consequently, under normal loads, the stresses will be more highly concentrated at the outermost threads 13, as indicated by the lines B, transferring the base of the stress application from the inner to the outer threads. Thus, upon an increased load on the bolt, the stretching of the bolt caused by such load will bring the inner threads into complete contact with the threads 11, causing them to take up their share of the load and stresses, and resulting in a dissipation of the stresses throughout the entire length of the threaded connection, between the screw member 12 and the bolt 10, and also very materially reducing liability of breakage.

The manufacturing of such screw members 12 to fit standard nuts and taps can be accomplished by heating the barstock from which the screw member is to be made, to a temperature of substantially 100 degrees Fahrenheit above the atmospheric temperature in the room in which the screw members are to be made, and then cutting the thread. By this method, when the screw member cools, it will naturally contract, and consequently reduce the pitch of the threads from their pitch when they were cut upon the barstock at the high temperature.

This variation in the pitch of the threads of the screw member over the bolt is only a very small amount, such as from 1/1000 to 1/5000 of an inch for each 1 inch in length of the nut.

If it is so desired, the taps or screw member may have standard threads and nut have threads of slightly longer pitch, without departing from the spirit of the present invention, and in such instances the manufacturing of the nuts is effected by cooling the nut to a predetermined temperature before and during the cutting of said threads, and when the nut is warmed to atmospheric temperature the threads thereon will be of slightly longer pitch.

It will be understood that the invention is not to be limited to the specific construction or arrangement of parts shown, but that they may be widely modified within the invention defined by the claims.

What is claimed is:

1. The method of manufacturing screw-threaded members consisting in heating the barstock from which the screw-threaded member is to be made, to a predetermined thermal degree above the surrounding atmospheric temperature, and then cutting the threads thereon while heated.

2. The method of manufacturing screw-threaded members consisting in heating the barstock from which the screw-threaded member is to be made, to a thermal degree approximately 100 degrees F. above the surrounding atmospheric temperature, and then cutting the threads thereon while heated.

3. The method of manufacturing screw-threaded members, consisting in heating the barstock from which the screw-threaded member is to be made in such manner as to change its temperature a predetermined amount from the surrounding atmospheric temperature, and then cutting threads thereon during the maintenance of the temperature difference.

HANS G. H. LINNENBRUEGGE.